United States Patent
Nukushina

(10) Patent No.: US 6,914,409 B2
(45) Date of Patent: Jul. 5, 2005

(54) CURRENT DETECTION METHOD AND CONTROL APPARATUS FOR ELECTRIC MOTOR

(75) Inventor: Harunobu Nukushina, Fuji (JP)

(73) Assignee: Toshiba Carrier Corporation, Tokyo (JP)

(*) Notice: Subject to any disclaimer, the term of this patent is extended or adjusted under 35 U.S.C. 154(b) by 0 days.

(21) Appl. No.: 10/472,906

(22) PCT Filed: Mar. 25, 2002

(86) PCT No.: PCT/JP02/02856

§ 371 (c)(1),
(2), (4) Date: Sep. 25, 2003

(87) PCT Pub. No.: WO02/078168

PCT Pub. Date: Oct. 3, 2002

(65) Prior Publication Data

US 2004/0095090 A1 May 20, 2004

(30) Foreign Application Priority Data

Mar. 26, 2001 (JP) ........................ 2001-087359

(51) Int. Cl.⁷ .............................. H02P 5/34; H02P 7/42; G05B 11/28; H02M 3/335
(52) U.S. Cl. ...................... 318/800; 318/803; 318/806; 318/799; 318/811; 318/599; 363/26; 363/21.1; 363/21.11; 363/21.18; 363/41
(58) Field of Search ............................ 318/800–803, 318/806, 810, 799, 811, 599; 363/26, 28, 19, 21.01, 21.09, 21.1, 21.11, 21.17, 21.18, 23, 41, 25

(56) References Cited

U.S. PATENT DOCUMENTS

| | | | | |
|---|---|---|---|---|
| 4,465,961 A | * | 8/1984 | Landino | 318/811 |
| 5,420,492 A | * | 5/1995 | Sood et al. | 318/803 |
| 5,637,975 A | * | 6/1997 | Pummer et al. | 318/811 |
| 5,969,958 A | * | 10/1999 | Nielsen et al. | 363/41 |
| 6,445,155 B1 | * | 9/2002 | Williams et al. | 318/811 |
| 6,529,393 B1 | * | 3/2003 | Yu | 363/41 |
| 6,586,902 B2 | * | 7/2003 | Gotou et al. | 318/599 |
| 6,639,372 B2 | * | 10/2003 | Gotou | 318/811 |
| RE38,439 E | * | 2/2004 | Czerwinski | 363/44 |
| 6,735,537 B2 | * | 5/2004 | Liu et al. | 318/811 |

FOREIGN PATENT DOCUMENTS

| | | | |
|---|---|---|---|
| JP | 02-007893 | 1/1990 | |
| JP | 06-351280 | 12/1994 | |
| JP | 09-056193 | 2/1997 | |
| JP | 10-155278 | 6/1998 | |
| JP | 10155278 A | * 6/1998 | ............ H02M/7/48 |
| JP | 10-271180 | 10/1998 | |

* cited by examiner

Primary Examiner—Edgardo San Martin
(74) Attorney, Agent, or Firm—Pillsbury Winthrop, LLP

(57) ABSTRACT

A current detection method for an electric motor which detects phase currents of the electric motor driven by a power converter that provides ON/OFF control of bridge-connected switching elements, based on a pulse-width modulation excitation pattern, to convert a direct current into poly-phase alternating currents. The method includes connecting a current detecting element which produces a signal corresponding to a current value at the direct current side of the power converter and changing the pulse-width modulation excitation pattern by executing a shift of time of any of the phases of the pulse-width modulation excitation pattern so that a signal directly or indirectly corresponding to the phase currents is produced at the current detecting element. The method also includes detecting the phase currents of the electric motor based on the signal produced at the current detecting element and the excitation pattern which has been changed.

8 Claims, 7 Drawing Sheets

FIG. 2

| EXCITATION MODE | U-PHASE | V-PHASE | W-PHASE | DETECTED CURRENT PHASE |
|---|---|---|---|---|
| 0 | L | L | L | –(CURRENT=0) |
| 1 | L | L | H | W-PHASE(+) |
| 2 | L | H | L | V-PHASE(+) |
| 3 | L | H | H | U-PHASE(–) |
| 4 | H | L | L | U-PHASE(+) |
| 5 | H | L | H | V-PHASE(–) |
| 6 | H | H | L | W-PHASE(–) |
| 7 | H | H | H | –(CURRENT=0) |

CURRENT DETECTION METHOD AND CONTROL APPARATUS FOR ELECTRIC MOTOR

This is the National Stage of PCT/JP02/02856, filed on Mar. 25, 2002, which designated the U.S., and was not filed in the English language.

BACKGROUND OF THE INVENTION

This invention relates to a vector control for an electric motor, and more particularly to a current detection method for an electric motor, which detects phase currents by single current detecting element, and a control apparatus for an electric motor using such a method.

In the case where vector control of an electric motor is carried out, it is required to convert an alternating current into an alternating voltage, and to obtain a voltage waveform having less phase lag with respect to a current waveform. As means for converting an alternating current into an alternating voltage, there are instrument current transformers generally called a CT (Current Transformer) and a Hall CT based on Hall effect, etc. Among them, the Hall CT is expensive and its use is limited. For this reason, a current detection method and a control apparatus for an electric motor using the instrument current transformer will be described below.

FIG. 8 is a block diagram showing the configuration of a conventional control apparatus for an electric motor, which detects a current by using a CT to carry out vector control of the electric motor on the basis of the detected value. In this figure, a smoothing capacitor 3 is connected to the output side of an AC/DC converter 2 also called a converter which converts an alternating current into a direct current of an AC power supply 1, and the smoothed direct current is delivered to a DC/AC converter 5 also called inverter. The DC/AC converter 5 is comprised of bridge-connected switching elements such as IGBT, etc., and serves to carry out ON/OFF control of these switching elements in accordance with a basic excitation pattern determined in advance to thereby convert a direct current into three phase alternating currents to deliver the three phase alternating currents to an electric motor 7. A current detecting resistor 4 for detecting an input current is connected to the DC side of this DC/AC converter 5, and CTs 6a, 6b for respectively detecting currents of two phases of three phase alternating currents are provided between the DC/AC converter 5 and the electric motor 7.

Moreover, an overcurrent detecting circuit 8 for detecting overcurrent is connected to the current detecting resistor 4, and a current detector 9 is connected to the CTs 6a, 6b. Among them, the current detector 9 detects currents of two phases on the basis of respective output signals of the CTs 6a, 6b, and detects, by calculation, current of the remaining one phase because a value obtained by totalizing instantaneous values of three phase alternating currents is equal to zero at all times to apply current detection signals of three phases to a rotor position detector 10. The rotor position detector 10 detects the rotor position of the electric motor 7 on the basis of the current detection signals of three phases.

Waveform generator 11 generates basic excitation pattern for carrying out ON/OFF control of plural switching elements constituting the DC/AC converter 5 in order to output pulse-width modulated three-phase alternating currents on the basis of the detected rotor position signal and a rotational frequency command given from the external. Further, a drive circuit 12 carries out ON/OFF control of the switching elements constituting the DC/AC converter 5 in accordance with this excitation pattern, and stops the ON/OFF control of the switching elements when the overcurrent detecting circuit 8 detects overcurrent.

In the above-described conventional control apparatus for an electric motor, in order to detect currents of three phases delivered to electric motor 7, two current detecting elements, i.e., CTs 6a and 6b were required. If there may be employed with respect to such a configuration an approach in which the number of current detecting elements is reduced to one and the current detecting element is removed from the connecting path of electric motor 7 with respect to DC/AC converter 5, simplification of the configuration including wiring can be realized. This is advantageous.

This invention has been made in view of the above circumstances, and its object is to provide a current detection method for an electric motor, which detects currents of respective phases delivered to the electric motor by single electric detecting element, and a control apparatus for an electric motor using such a method.

DISCLOSURE OF THE INVENTION

A current detection method for an electric motor according to the present invention is characterized by detecting phase currents of the electric motor driven through a power converter adapted for carrying out ON/OFF control of bridge-connected plural switching elements in accordance with a predetermined excitation pattern to thereby convert direct current into poly-phase alternating currents, the current detection method comprising:

connecting a current detecting element which produces a signal corresponding to a current value at the direct current side of the power converter;

changing the predetermined excitation pattern so that a signal directly or indirectly corresponding to the phase currents is produced at the current detecting element; and detecting phase currents of the electric motor on the basis of the signal produced at the current detecting element and the excitation pattern which has been changed.

A control apparatus for an electric motor according to the present invention in which, in driving the electric motor through a power converter for carrying out ON/OFF control of bridge-connected plural switching elements in accordance with a predetermined excitation pattern to thereby convert direct current into poly-phase alternating currents, there is employed an approach to detect phase currents of the electric motor to determine a rotor position on the basis of the phase currents to generate the excitation pattern in a manner to follow the rotor position, the control apparatus comprising:

a current detecting element connected to the direct current side of the power converter and serving to produce a signal corresponding to current value;

waveform changing means for changing the predetermined excitation pattern so that a signal produced at the current detecting element directly or indirectly corresponds to phase currents; and current detecting means for detecting phase currents of the electric motor on the basis of the signal produced at the current detecting element and the excitation pattern which has been changed, thus to generate the predetermined excitation pattern on the basis of the phase currents detected at the current detecting means to carry out ON/OFF control of the switching elements in accordance with the excitation pattern which has been changed by the waveform changing means.

BRIEF DESCRIPTION OF THE DRAWINGS

In the accompanying drawings,

FIG. 2 is a Table showing three kinds of change examples in which waveform changer changes carries out pattern change with respect to basic excitation pattern of waveform generator, and current detection state.

BEST MODE FOR EMBODYING THE INVENTION

Figure 1:
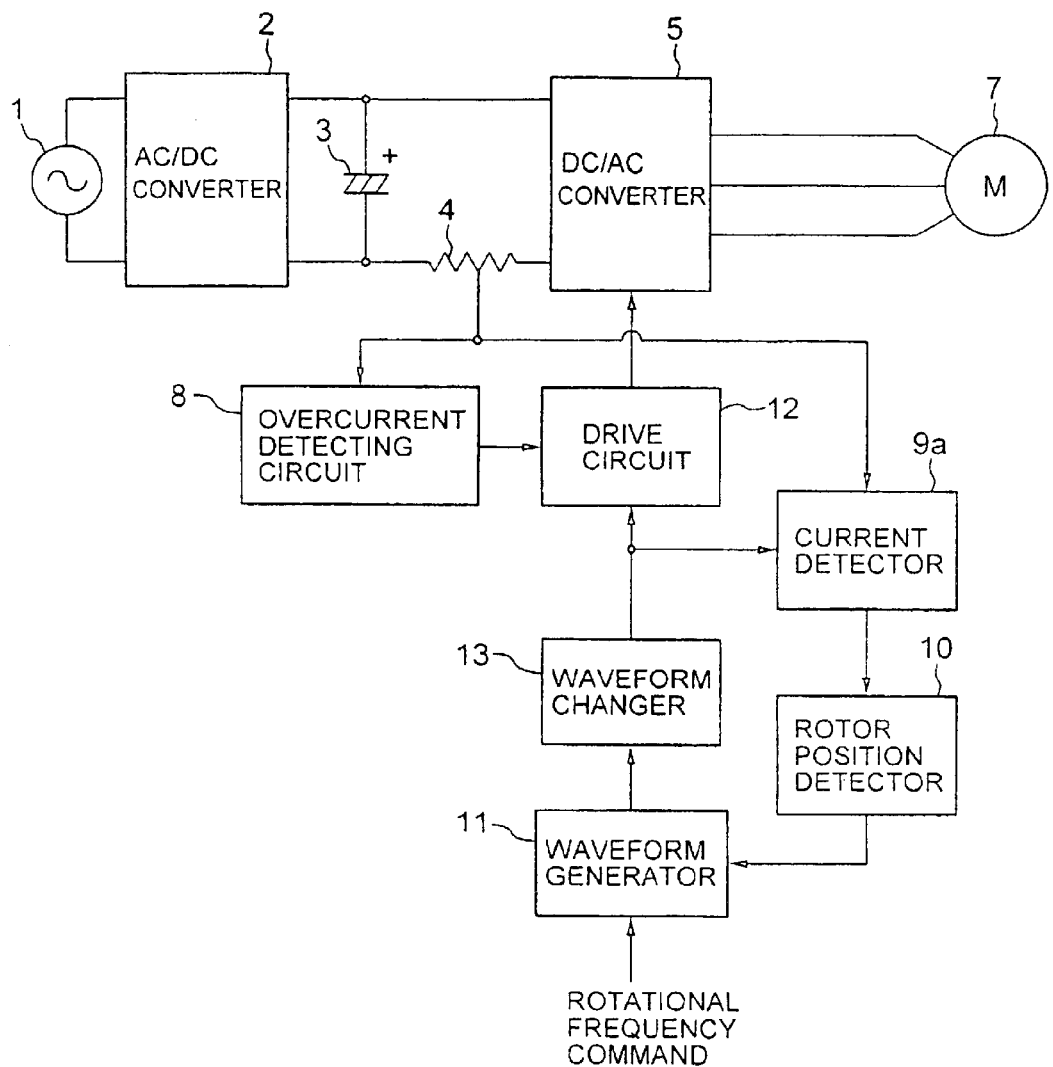
FIG. 1 is a block diagram showing a current detection method according to this invention, and the configuration of a control apparatus for an electric motor using such a method.
Figures 7, 8:
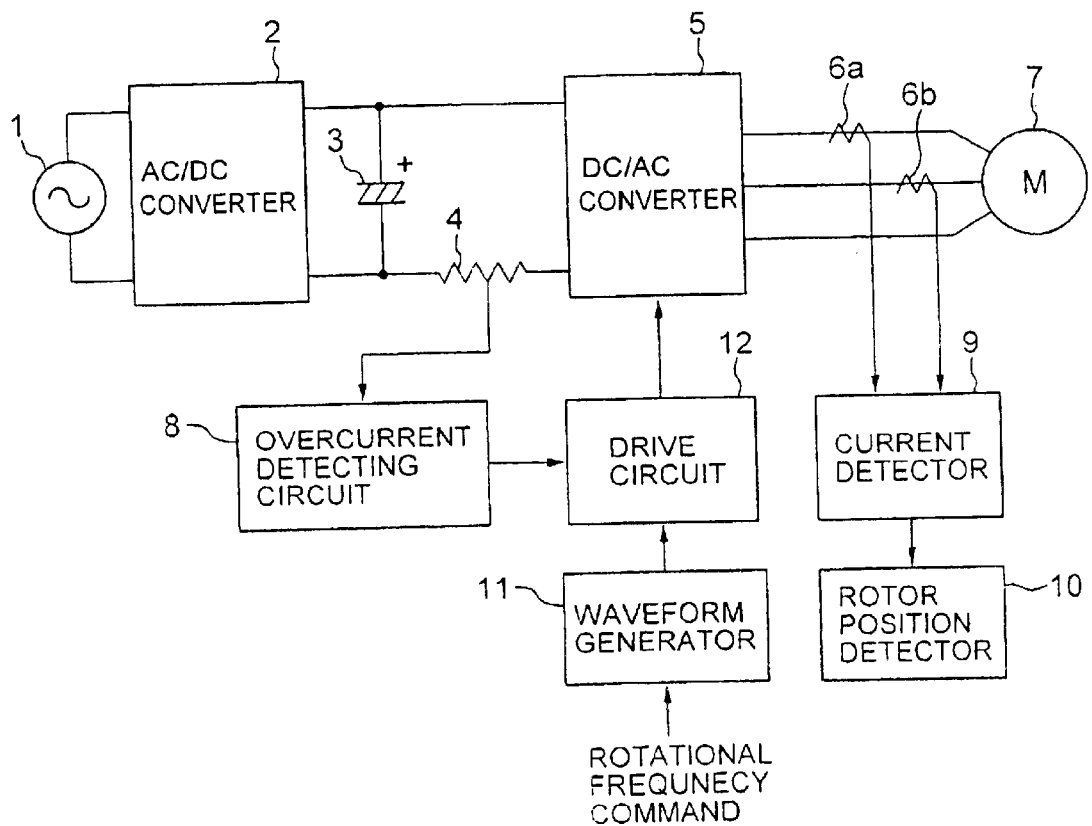
FIG. 7 is a Table showing the relationship between excitation states with respect to respective windings and phases to which detection current values correspond.
FIG. 8 is a block diagram showing a conventional current detection method and the configuration of a control apparatus for electric motor using such a method.

This invention will now be described in detail on the basis of the preferred embodiment shown in the drawings. FIG. 1 is a block diagram showing a current detection method according to this invention and the configuration of a control apparatus for an electric motor using such a method, and the same reference numerals are respectively attached to the same elements as those of FIG. 8 showing the conventional apparatus in the figures and explanation thereof will be omitted. In this embodiment, the current detecting resistor 4 for detecting overcurrent is commonly used as an element for detecting phase current, and a current detector 9a detects currents of three phases delivered to electric motor 7 on the basis of voltage produced across the both ends thereof. In order to permit such current detection, a waveform changer 13 which changes basic excitation pattern for carrying out pulse width modulation (PWM) is provided between waveform generator 11 and drive circuit 12, and the current detector 9a is constituted so as to determine currents of respective phases by making reference to output signal waveform of this waveform changer 13.

The operation of this embodiment constituted as described above will be described below together with its principle. When DC/AC converter 5 outputs pulse-width modulated three phase alternating currents, it is possible to detect current of a specific phase by excitation pattern with respect to switching elements constituting this DC/AC converter 5. For example, if there exists excitation pattern where only a current of U-phase is at H level and currents of V-phase and W-phase are both at L level, a voltage produced across the both ends of the current detecting resistor 4 corresponds to the U-phase current. In addition, at the time period where currents of both U-phase and V-phase are at H level and a current of W-phase is at L level, a voltage obtained by inverting sign of voltage produced across the both ends of the current detecting resistor 4 corresponds to the W-phase current.

As stated above, if there is employed such an approach to sequentially detect currents of three phases in accordance with excitation pattern of pulse-width modulated waveform to store them, it is possible to detect currents of three phases although such current detection is carried out in a time divisional manner. In this case, since phase currents are not detected at the same time, there takes place error in practice. However, if the circuit equation is solved by using current detection values of three phases which have been detected in a time divisional manner as long as particular strictness is not required, it is possible to calculate the following excitation pattern, i.e., ON/OFF pattern of switching elements constituting the DC/AC converter 5.

By the above-described method, vector control of the electric motor can be carried out. However, when time period for reading current values in a time divisional manner is large, there is the possibility that error becomes large with respect to current values of three phases detected at the same time, resulting in the possibility that the electric motor cannot be stably driven. For this reason, it is necessary to read currents of three phases at the time period as short as possible.

On the other hand, since the circuit state is not stable immediately after ON/OFF state of the switching element is changed, minimum stand-by time τ until a signal produced at the current detecting element is read is required. When this stand-by time τ is assumed to be, e.g., 20 microseconds, it is necessary to continue a specific excitation state at more than 20 microseconds in order to read current of one phase. In other words, in the case where continuation time in the same excitation state is shorter than 20 microseconds, reading operation of current cannot be carried out. As a result, it is impossible to update current value of phase to be updated at that time.

Further, in the pulse width modulation, at the timing where current values of two phases are the same, i.e., points where instantaneous values of two phase currents cross with lapse of time (30°, 90°, 150°, 210°, 270°, 330° in terms of electrical angle), excitation states of two phases are switched at the same time. For this reason, at this time, current detection of a new phase cannot be carried out.

Figure 2:
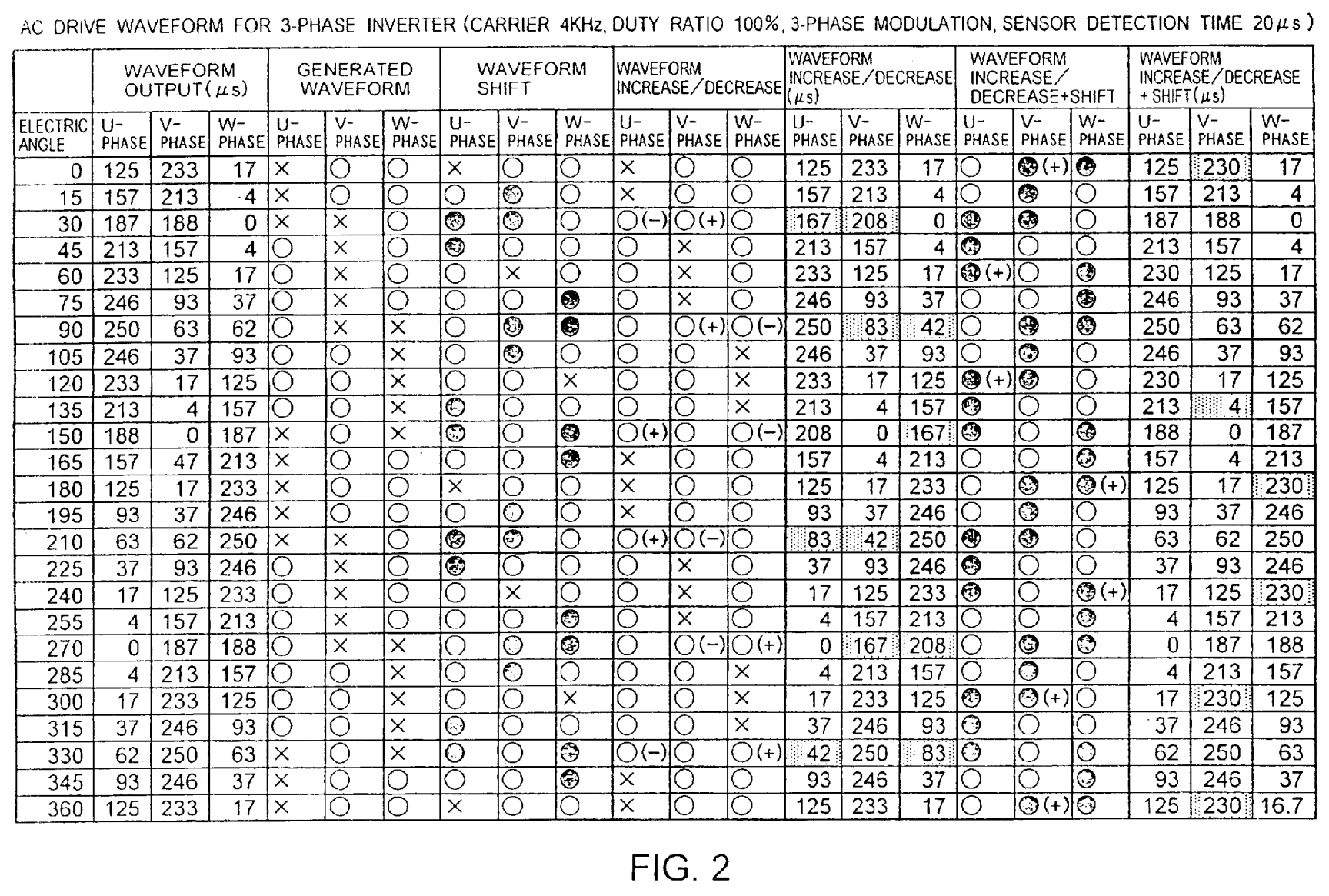
Figure 3:
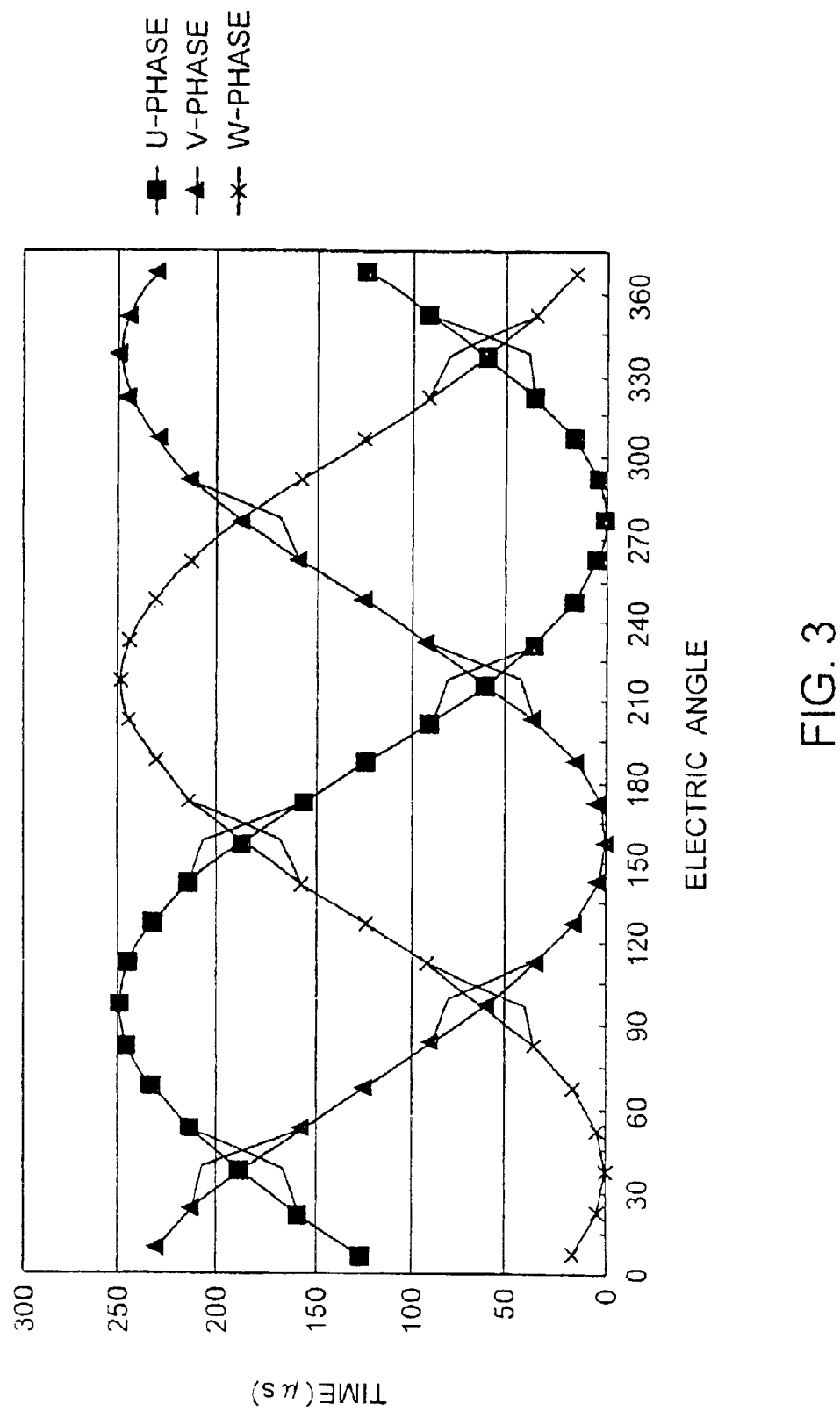
FIG. 3 is a waveform diagram showing one change example of the basic excitation pattern in the state where an excitation time and an electrical angle are caused to be in correspondence with each other.

The Table shown in FIG. 2 shows a change example where the waveform changer 13 changes pulse-width modulated waveform with respect to the excitation pattern of the waveform generator 11, FIG. 3 is a diagram showing the relationship between electrical angles of pulse width changed waveforms corresponding to these waveform changes and time width (microseconds.), and FIGS. 4A–4C and 5A–5C are time charts corresponding to the changes. The relationship between the time width and phase shift will be described below in detail.

First, the column of "waveform output" of FIG. 2 shows ON time width corresponding to the basic excitation pattern that the waveform generator 11 outputs every main electrical angles corresponding to one cycle, and particularly shows the case where carrier frequency for generating pulse-width modulated waveform is 4 kHz and ON duty is 100%.

In this FIG. 2, circles and Xs indicate phase caused to undergo waveform shift. Namely, it is indicated that even if other corresponding phases are shifted, similar effects are provided. Moreover, (+) indicates that ON time of the positive voltage side (upper side) arm is increased and (−) indicates that ON time of the upper side arm is decreased. Further, time of processed waveform output is an example of "waveform increase/decrease+shift" and mesh portions indicate that time is increased.

Figure 4A:
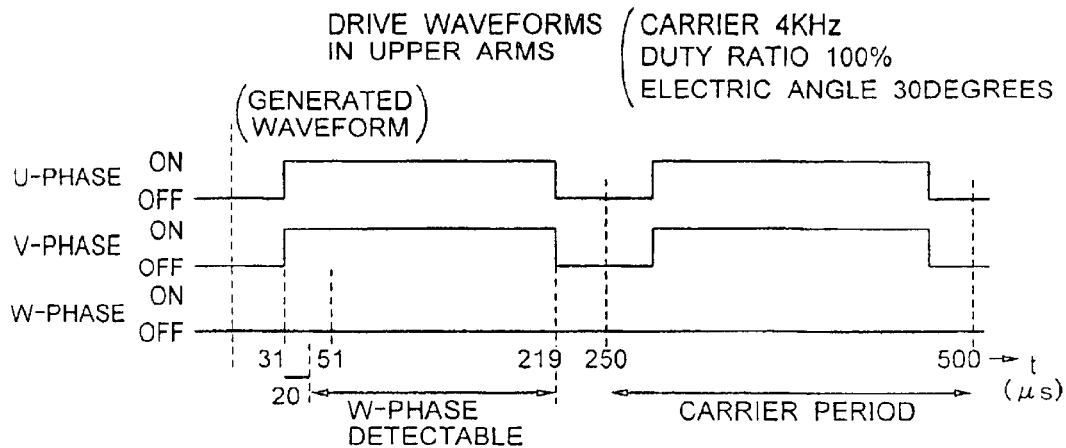
FIGS. 4A–4C are time charts for explaining the operation of the embodiment shown in FIG. 1, FIGS. 5A–5C are time charts for explaining the operation of the embodiment shown in FIG. 1.

When attention is drawn to the point where electrical angle is 30 degrees among them, ON/OFF states of switching elements of respective U, V and W phases of the positive voltage side arm of switching elements constituting the DC/AC converter 5 are indicated as in FIG. 4A. Namely, a time width where switching element of U-phase is placed in ON state is 187 microseconds, a time width where switching element of V-phase is placed in ON state is 188 microseconds, and a time width where switching element of W-phase is placed in ON state is zero. At this time, at the time when 31 microseconds is passed from the reference positions (0, 250, 500, . . . ) of carrier, waveforms of U-phase and V-phase change from L level to H level. On the other hand, because a stand-by time of 20 microseconds is required until the circuit becomes stable from change of waveform, the time period from 51 microseconds to 219 microseconds results in the time period in which W-phase current can be precisely detected. However, currents of U-phase and V-phase cannot be detected. In the column of "generated waveform" in FIG. 2, the fact that detection of current of W-phase can be carried out is indicated by circle, namely mark ○, and the fact that detection of currents of U-phase and V-phase cannot be detected is indicated by mark X.

Figure 4B:
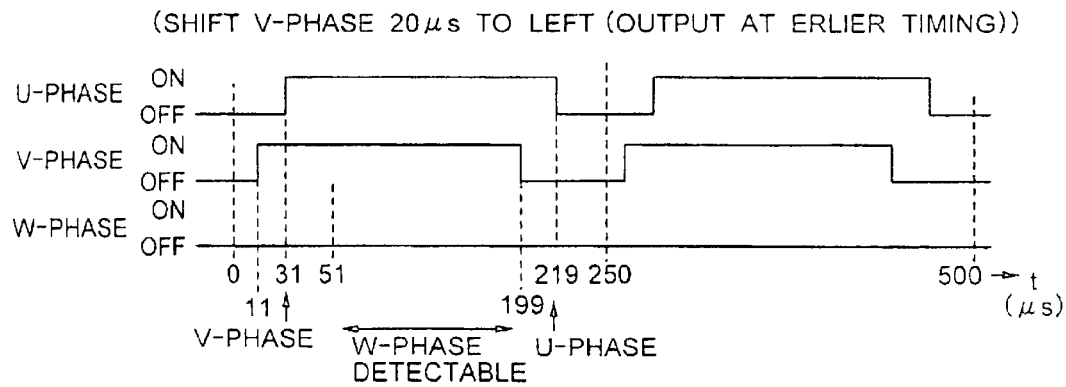

Subsequently, when rising timing and falling timing of a waveform of V-phase are caused to be earlier by 20 microseconds, i.e., a waveform of V-phase is shifted by 20 microseconds to the left side of the drawing as shown in FIG. 4B, the waveform of V-phase rises at 11 microseconds from the reference position of carrier. For this reason, at 31 microseconds where the circuit is stable, detection of a current of V-phase can be carried out. At times subsequent to 51 microseconds, detection of a current of W-phase can be carried out. Further, at 219 microseconds, detection of a current of U-phase can be carried out. It is to be noted that even if there is employed such an approach to shift the waveform of U-phase to the left side of the drawing by 20 microseconds in place of shifting a waveform of V-phase to the left side of the drawing by 20 microseconds, it is possible to detect all currents of U-phase, V-phase and W-phase. In the column of "waveform shift" in FIG. 2, phases which can be detected by shift of waveform are indicated by ○ colored black, phases which can be detected even if shift of a waveform is not carried out are indicated by mark ○, and phases which cannot be directly detected when a waveform is only shifted are indicated by mark X.

The waveform changer 13 shown in FIG. 1 executes such waveform shift and the current detector 9a reads a voltage value produced at the current detecting resistor 4 at respective current detection timings of the changed excitation pattern, thereby making it possible to directly detect currents of respective phases of U, V, W (FIG. 4A shows this state), or to directly detect currents of two phases to indirectly detect current of the remaining phase from these two phases.

As stated above, since the method of shifting a waveform of any one phase of the basic excitation pattern substantially by stand-by time τ does not change ON time width. Accordingly, an output voltage is not changed. As a result, detection of a phase current can be made in the state of sine wave where there is no waveform distortion. Further, since the number of electrical angles where currents of three phases can be directly detected is increased, it also advantageously becomes difficult to experience effect or influence of disturbance superimposed on a current. In addition, in the embodiment shown in FIG. 1, since the current detecting resistor 4 for detecting overcurrent is caused to be a current detecting element, the advantage that simplification of the configuration including wiring can be realized is also obtained.

Meanwhile, while a waveform of any one phase of the basic excitation patterns is shifted substantially by stand-by time τ in the above-described example, even if time width is changed in place of this, substantially similar detection of a phase current can be made. This will be described below.

Figure 4C:
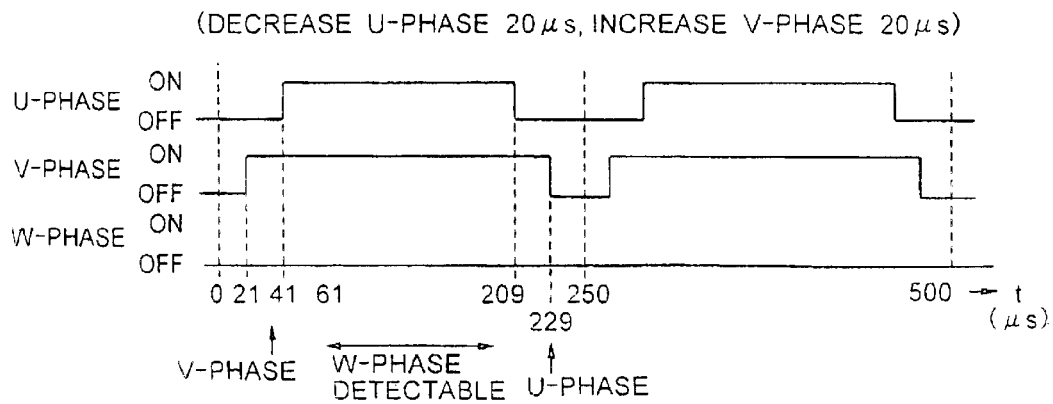

In the case where a time width of U-phase is shortened (decreased) by 20 microseconds and a time width of V-phase is expanded (increased) by 20 microseconds as shown in FIG. 4C, it is possible to detect current of V-phase at the time point when 41 microseconds is passed from the reference position of a carrier, to detect a current of W-phase at time after 61 microseconds is passed, and to detect a current of U-phase at 229 microseconds. In the column of "waveform increase/decrease" in FIG. 2, phases in which current detection can be directly made by increase/decrease of a time width are indicated by mark ○ and phases in which current detection can be only indirectly made are indicated by mark X. In addition, as numeric values of another column of "waveform increase/decrease" in FIG. 2, partially changed time widths are indicated.

As is clear from FIGS. 2 and 4, at at least 30 degrees of electrical angle, only by changing time width of a waveform corresponding to ON time, it is possible to directly detect currents of U, V, W phases. However, it is understood that the number of electrical angles where a current is only indirectly detected is increased as compared to the case where a waveform is shifted. As stated above, the method of changing ON time width of waveform has the drawback that output voltage deviates from the primary value so that waveform distortion is produced, but has the advantage that since it is possible to detect phase current at two time points of the first half and the latter half of a period of carrier, control better in response than that of the case where a waveform is shifted can be carried out.

Since there are instances where it is impossible to directly detect all phase currents of U, V, W in the above-described two current detection methods, it was required to indirectly detect the remaining phase current by two phase currents in such cases. Accordingly, if error component a by disturbance is superimposed on one of two detectable phase currents, the other phase current also necessarily includes error component a. Thus, high accuracy control cannot be conducted. In view of the above, if currents of three phases are assumed to be all directly detected, it is understood that when sum total of those currents is not equal to zero, error component by disturbance is superimposed on at least one phase. For this reason, it is possible to correct this error. As a method for permitting direct detection of all currents of three phases, it is conceivable to combine shift of a waveform and change of a time width.

Figure 5A:
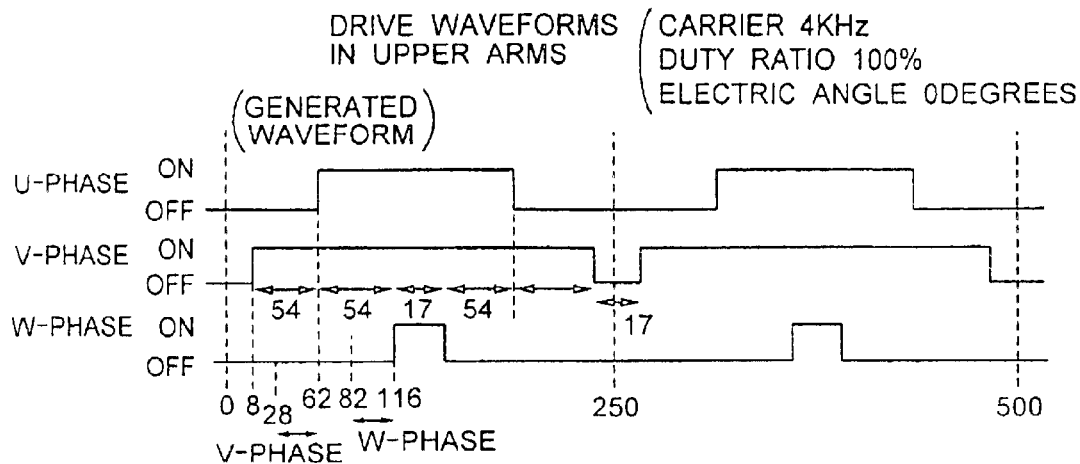
Figure 5B:
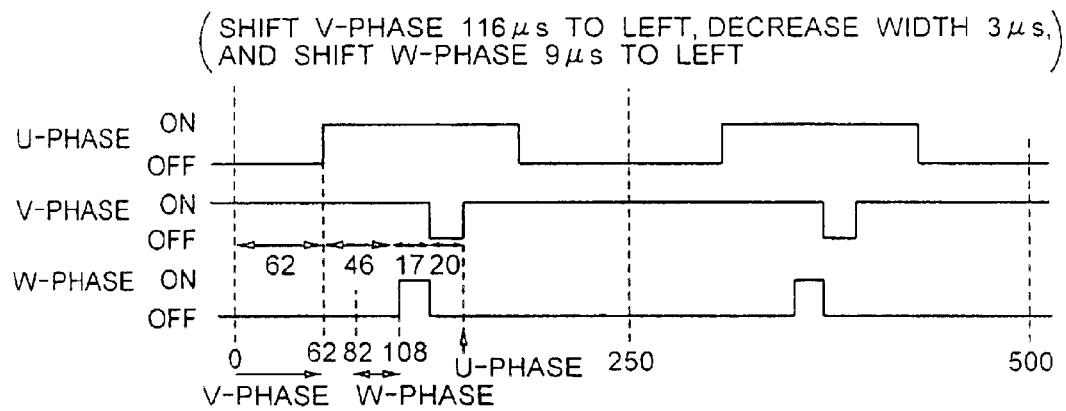
Figure 5C:
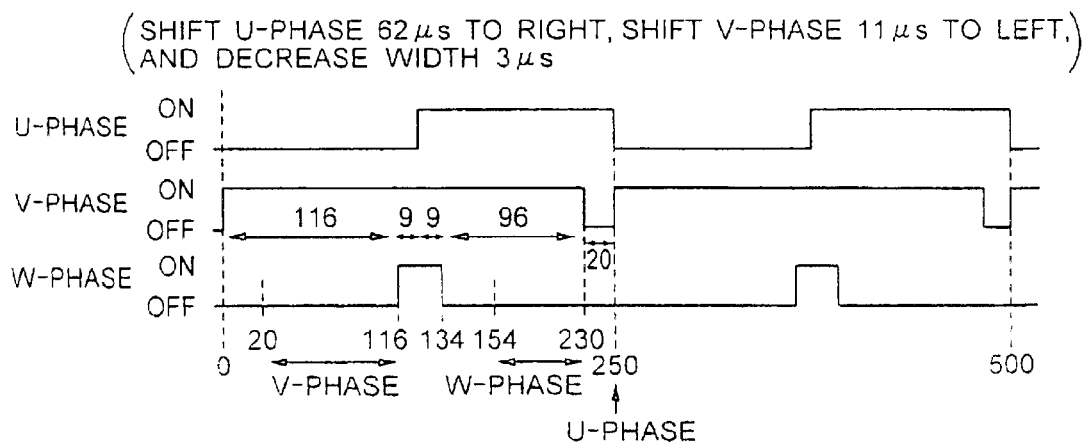

FIGS. 5A, 5B, 5C are the examples where a phase of a waveform corresponding to ON time is shifted and a time width is also changed, and are time charts particularly corresponding to 0 degrees of electrical angle. As shown in FIGS. 2 and 5A, at the electrical angle of 0 degrees in the basic excitation pattern, ON time width of a waveform of U-phase is 125 microseconds, ON time width of a waveform of V-phase is 233 microseconds and ON time width of a waveform of W-phase is 17 microseconds. In this state, it is possible to detect a V-phase current at the time period from 25 microseconds to 62 microseconds from the reference position of a carrier and it is possible to detect a W-phase current at the time period from 82 microseconds to 116 microseconds. However, it is impossible to directly detect a current of U-phase. FIG. 5B is the example where a waveform of V-phase is shifted to the left side by 116 microseconds, its time width is shortened by 3 microseconds and a waveform of W-phase is shifted to the left side by 9 microseconds. Thus, it is possible to detect a current of V-phase until 62 microseconds from the reference position of a carrier, it is possible to detect a current of W-phase at the time period from 82 microseconds to 108 microseconds, and it is possible to detect a current of U-phase at 145 microseconds.

FIG. 5C is another example, and shows the case where waveform of U-phase is shifted to the right side by 62 microseconds, waveform of V-phase is shifted to the left side by 11 microseconds, and the time width is shortened by 3 microseconds. Thus, it is possible to detect a current of V-phase at the time period from 20 microseconds to 116 microseconds from the reference position of a carrier, it is possible to detect a current of W-phase at the time period from 154 microseconds to 230 microseconds, and it is possible to detect a current of U-phase at 250 microseconds.

In the column of "waveform increase/decrease+shift" in FIG. 2, phases in which current detection can be made in the state including shift of a waveform are indicated by mark ○ colored black and phases in which current detection can be made without shift of waveform are indicated by mark ○. By carrying out shift of a waveform or changing a time width in accordance with electrical angle in this way, it is possible to directly detect currents of all phases of all electrical angles. In another column of "waveform increase/decrease+shift" in FIG. 2, ON time widths of respective phases of all electrical angles obtained by implementing these changes are described as numeric values.

As a result, it is possible to correct a current value so that sum total of currents of respective phases is equal to zero, and/or to carry out comparison with a current detection value of the last time to estimate phase in which error component by disturbance is superimposed. Thus, it is possible to detect phase currents or winding currents of the electric motor with high accuracy.

FIG. 3 is a diagram showing values before change and after change in the case where increase/decrease of a time width is carried out at electrical angle where current detections of respective phases cannot be carried out as they are with respect to the basic excitation pattern as described above, wherein thick lines indicate a time width before change, and thin lines depicted in a partially separated manner indicate a time width after change. As is clear from this FIG. 3, it is understood that time widths for realizing ON state are relatively greatly changed in the vicinity of points (30°, 90°, 150°, 210°, 270°, 330° in terms of electrical angle) where instantaneous values of two phase currents cross.

The Table shown in FIG. 2 is a Table corresponding to the case where ON duty is 100%. On the other hand, in the case where, e.g., ON duty is 20% or 5%, shift of a waveform and/or increase/decrease of a time width are required at most electrical angles. However, description thereof is omitted in this specification because of simplification of the drawings and the explanation.

Figure 6:
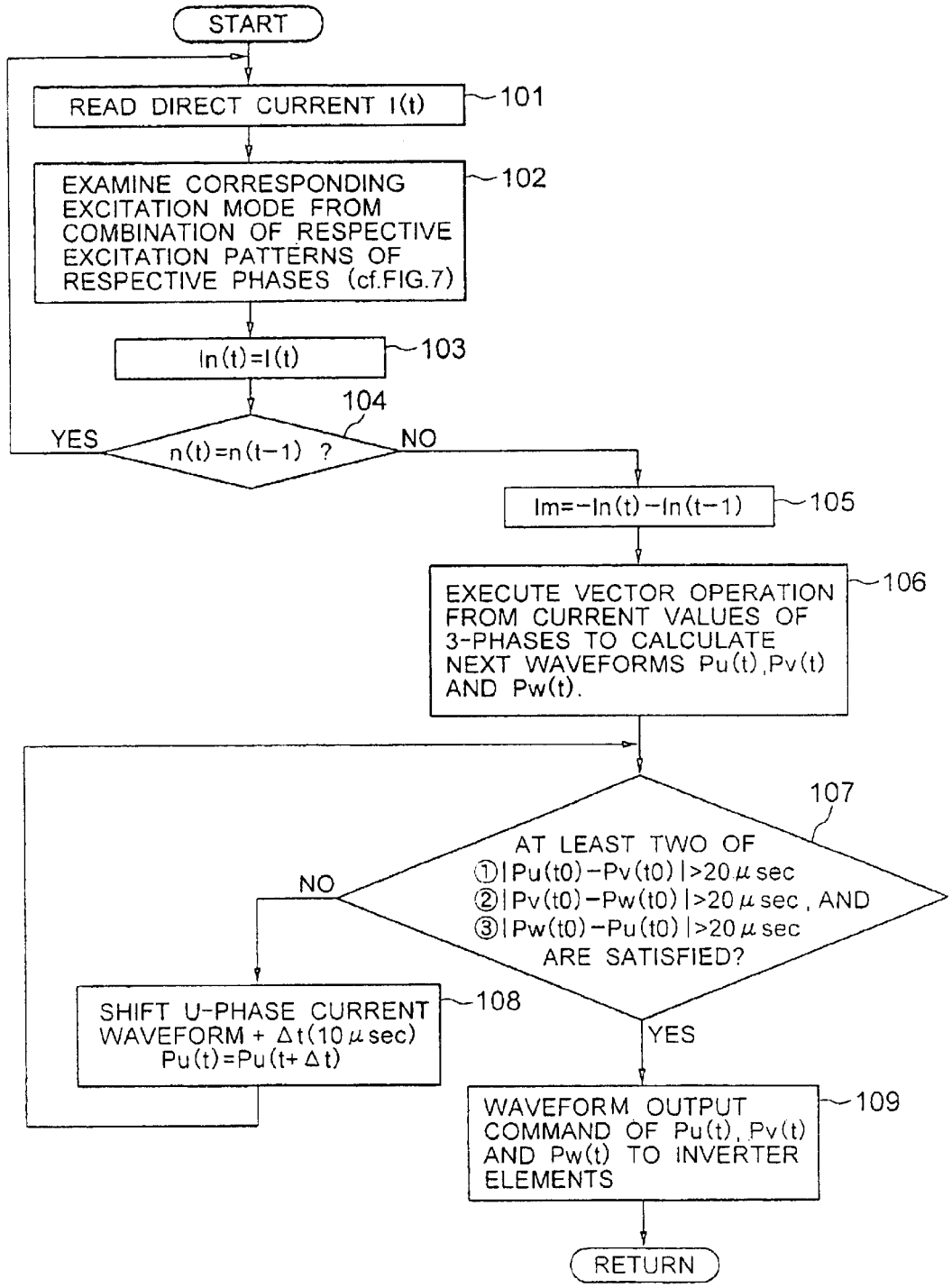
FIG. 6 is a flowchart showing more practical processing procedure in the case where a microprocessor, etc. is caused to have the functions of the embodiment shown in FIG. 1.

FIG. 6 is a flowchart showing more practical processing procedure corresponding to respective functions of current detector 9a, waveform generator 11 and waveform changer 13 in the case where a microprocessor is caused to have respective functions of overcurrent detecting circuit 8, current detector 9a, rotor position detector 10, waveform generator 11 and drive circuit 12 in the embodiment shown in FIG. 1 to carry out waveform shift. As well known, the range from 0 degrees to 360 degrees in terms of electrical angle shown in FIG. 2 or FIG. 3 is divided into six excitation modes. Further, when excitation mode where currents of all phases are equal to zero is included, there are eight excitation modes indicated as 0 to 7 as shown in FIG. 7 which is Table showing the relationship between excitation states with respect to respective windings and phases to which detection current values correspond.

In view of the above, first, at step 101, at a predetermined timing t where a change of excitation pattern is carried out, direct current I(t) is read. At step 102, a corresponding excitation mode is examined from combination of respective excitation patterns of U-phase, V-phase, W-phase, and whether an obtained direct current is any one of currents of U-phase, V-phase, W-phase is discriminated by making reference to the Table of FIG. 7. Subsequently, at step 103, direct current I(t) is stored as current of n-phase (n=U, V, W). Then, at step 104, whether or not measured phase n(t−1) of the last time and measured phase n(t) of this time are equal to each other is discriminated. Until these phases change, i.e., two phase currents are directly detected, processing of the steps 101 to 104 are repeated.

Then, at step 105 after two phase currents are detected, current In(t) of n-phase of this time and value obtained by changing sign of current In (t−1) of other phase measured at the last time are added to thereby determine current Im of the remaining one phase m (m=U, V, W). Thus, currents of three phases are obtained. Subsequently, at step 106, vector operation is executed from current values of three phases to calculate the next waveforms Pu(t), Pv(t), Pw(t) corresponding to the basic excitation pattern to be outputted.

Then, at step 107, whether or not at least two of the case where absolute value of difference between rising Pu(t0) of the U-phase waveform and rising Pv(t0) of the V-phase waveform is more than 20 microseconds, the case where absolute value of difference between rising Pv(t0) of the V-phase waveform and rising Pw(t0) of the W-phase waveform is more than 20 microseconds, and the case where absolute value of difference between rising Pw(t0) of the W-phase waveform and rising Pu(t0) of the U-phase waveform is more than 20 microseconds are satisfied is discriminated. In the case where it is discriminated that the above-mentioned two conditions are not satisfied, excitation waveform of U-phase (or V-phase or W-phase) is shifted by Δt (10 microseconds) at step 108 to return to the processing of the step 107 for a second time. In the case where the above-mentioned two conditions are satisfied, output commands of excitation waveforms Pu(t), Pv(t), Pw(t) with respect to switching elements constituting the DC/AC converter 5 are given to complete current detection corresponding to one carrier period and output processing of excitation waveform.

By executing these processing, detection of phase currents of the electric motor can be made by using single current detecting element connected to the DC side of the DC/AC converter 5, and control of the electric motor using this current detection method can be made.

Thus, in accordance with this embodiment, waveform of any one phase of the basic excitation pattern is shifted substantially by stand-by time τ, whereby there can be obtained the advantage that detection of phase currents can be made in the state of sine wave free from waveform distortion, and it becomes difficult to experience effect or influence of disturbance superimposed on current. Further, since the current detecting resistor for detecting overcurrent is caused to be a current detecting element, there is also obtained the advantage that simplification of the configuration including wiring can be realized. By changing the time width of the basic excitation pattern, it is possible to detect a phase current at two time points of the first half and the latter half of period of a carrier. For this reason, there is obtained new advantage that control better in response than that of the case where a waveform is shifted can be carried out. Further, by shifting phase of a waveform corresponding to ON time of the basic excitation pattern and also by changing the time width, it is possible to correct a current value so that sum total of currents of respective phases becomes equal to zero, and to carry out comparison with a current detection value of the last time to estimate a phase in which error components by disturbance is superimposed. Thus, there is obtained the advantage that phase currents or winding currents of the electric motor can be detected with high accuracy.

It is to be noted that while explanation has been given in the above-mentioned embodiment in connection with the case where a direct current is converted into three phase alternating currents to operate a three-phase electric motor (DC electric motor may be also employed. In practice, a DC electric motor is employed.), this invention can be applied also to an apparatus adapted for carrying out conversion into alternating currents of a larger number of phases to drive electric motor.

In addition, while the current detecting resistor 4 connected to the DC side of the DC/AC converter 5 is commonly used as a current detecting element in the above-mentioned embodiment, CT, etc. used only for detection of a current may be provided in place of this.

As is clear from the above description, in accordance with this invention, it is possible to provide the current detection method for an electric motor which can detect currents of respective phases delivered to the electric motor by single current detecting element and the control apparatus for electric motor using this method.

What is claimed is:

1. A current detection method for an electric motor which detects phase currents of the electric motor driven by a power converter that provides ON/OFF control of bridge-connected switching elements, based on a pulse-width modulation excitation pattern, to convert a direct current into poly-phase alternating currents, said method comprising:

connecting a current detecting element which produces a signal corresponding to a current value at the direct current side of the power converter;

changing the pulse-width modulation excitation pattern by executing a shift of time of any of the phases of the pulse-width modulation excitation pattern so that there results a combination of: (i) a time period in which two phase currents flow at the same time for a time period more than a minimum standby time τ, and (ii) a time period in which at least one of the two phase currents independently flows for a time period more than the minimum standby time τ, so that a signal directly or indirectly corresponding to the phase currents is produced at the current detecting element, wherein the minimum standby time τ corresponds to the time interval from when the ON/OFF state of at least one of the switching elements changes until the time when a signal produced at the current detecting element is read; and detecting phase currents of the electric motor based on the signal produced at the current detecting element and the excitation pattern which has been changed.

2. A current detection method for electric motor according to claim 1, further comprising:

executing a change of time width of any of the phases of the pulse-width modulation excitation pattern so that there results combination of time period in which two phase currents flow at the same time for a time period more than the minimum standby time τ and a time period in which at least one of the two phase currents independently flows for a time period more than the minimum standby time τ.

3. A current detecting method for an electric motor according to claim 1, wherein said current detecting element is a current detecting resistor.

4. A current detecting method for an electric motor according to claim 1, wherein said current detecting element is a current transformer.

5. A control apparatus for an electric motor driven by a power converter that provides ON/OFF control of bridge-connected switching elements, based on a pulse-width modulation excitation pattern, to convert a direct current into three-phase alternating currents, said control apparatus comprising:

a current detecting element connected to the direct current side of the power converter and serving to produce a signal corresponding to a current value;

a waveform configured to generate the pulse-width modulation excitation pattern to follow the rotor position by determining the rotor position based on phase currents of said motor detected by said current detecting element;

a waveform changer configured to change the pulse-width modulation excitation pattern to directly or indirectly correspond to the phase currents, which are in accordance with the pulse-width modulation excitation pattern, in case the phase currents are not detectable based on the signal produced by said current detecting element; and a driving circuit configured to provide the ON/OFF control of the switching elements based on the excitation pattern which has been changed by the waveform changer, wherein the waveform changer changes the pulse-width modulation excitation pattern by executing a shift of time of any of the phases of the pulse-width modulation excitation pattern so that there results a combination of:

(i) a time period in which two phase currents flow at the same time for a time period more than a minimum standby time τ, and (ii) a time period in which at least one of the two phase currents independently flows for a time period more than the minimum standby time τ, and wherein said minimum standby time τ corresponds to the time interval from when the ON/OFF state of at least one of the switching elements changes until the time when a signal produced at the current detecting element is read.

6. A control apparatus for an electric motor according to claim 5, wherein the waveform changer executes a change of time width of any of the phases of the pulse-width modulation excitation pattern so that there results combination of time periods in which two phase currents flow at the same time for a time period more than the minimum standby time τ and time period in which at least one of the two phase currents independently flows for a time period more than the minimum standby time τ.

7. A control apparatus for an electric motor according to claim 5, wherein said current detecting element is a current detecting resistor.

8. A control apparatus for an electric motor according to claim 5, wherein said current detecting element is a current transformer.

* * * * *